(12) United States Patent
Wang et al.

(10) Patent No.: US 9,960,998 B2
(45) Date of Patent: *May 1, 2018

(54) FORWARDING PACKET IN STACKING SYSTEM

(71) Applicant: HEWLETT PACKARD ENTERPRISE DEVELOPMENT LP, Houston, TX (US)

(72) Inventors: Dong Wang, Beijing (CN); Hongyuan Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/338,765

(22) Filed: Oct. 31, 2016

(65) Prior Publication Data

US 2017/0163533 A1  Jun. 8, 2017

Related U.S. Application Data

(63) Continuation of application No. 14/399,964, filed as application No. PCT/CN2013/079893 on Jul. 23, 2013, now Pat. No. 9,509,610.

(30) Foreign Application Priority Data

Aug. 9, 2012 (CN) .......................... 2012 1 0281519

(51) Int. Cl.
   *H04L 12/741* (2013.01)
   *H04L 12/721* (2013.01)
   *H04L 12/931* (2013.01)

(52) U.S. Cl.
   CPC ............ *H04L 45/745* (2013.01); *H04L 45/44* (2013.01); *H04L 49/354* (2013.01); *H04L 49/70* (2013.01)

(58) Field of Classification Search
   CPC ..... H04L 45/745; H04L 49/15; H04L 49/354; H04L 49/70
   See application file for complete search history.

(56) References Cited

U.S. PATENT DOCUMENTS

2008/0002703 A1  1/2008 Tripathi et al.
2010/0135162 A1  6/2010 Takase
(Continued)

FOREIGN PATENT DOCUMENTS

CN  101572646 A  11/2009
CN  101599909 A  12/2009
(Continued)

OTHER PUBLICATIONS

Extended European Search Report, EP Patent Application No. 13827616.7, dated Jul. 23, 2013, pp. 1-8, EPO.
(Continued)

*Primary Examiner* — Pao Sinkantarakorn
(74) *Attorney, Agent, or Firm* — Hewlett Packard Enterprise Patent Department

(57) ABSTRACT

A first Virtual Device (VD) of a first member device connects to a first VD of a second member device via a stacking link that is established between the first member device and the second member device. A VD number of the first VD in the first member device is the same as that of the first VD in the second member device. When a unicast packet is received via a service port, the first VD of the first member device searches in a forwarding table of the first VD in the first member device. When the unicast packet is to be forwarded to another member device the search of the forwarding table, the first VD of the first member device forwards the unicast packet via the stacking link.

18 Claims, 4 Drawing Sheets

(56) References Cited

U.S. PATENT DOCUMENTS

2011/0085558 A1     4/2011   Gnanasekaran et al.
2012/0002670 A1     1/2012   Subramanian et al.

FOREIGN PATENT DOCUMENTS

| CN | 101699789 A | 4/2010 |
|----|-------------|--------|
| CN | 101820392 A | 9/2010 |
| CN | 102469021 A | 5/2012 |
| WO | WO-2012/065488 A1 | 5/2012 |

OTHER PUBLICATIONS

International Search Report and Written Opinion, International Application No. PCT/CN2013/079893, dated Oct. 31, 2013, pp. 1-10, SIPO.

FORWARDING PACKET IN STACKING SYSTEM

BACKGROUND

Data Center (DC) is developing from standardization, virtualization to automation. DC based on cloud computing is a target in the near future. With standardization as the foundation, virtualization is the technology to implement automated and cloud based DCs.

There may be many advantages for the digitalization of the DC. For example, resource utilization may be improved by integrating or sharing physical resources. Research shows that utilization of most of the DCs in the world is between 15% and 20%. By employing the technologies of standardization and virtualization, resource utilization of 50% to 60% may be implemented. An energy efficient, green DC may be implemented by employing virtualization technologies. For example, costs for physical devices, cables, physical space, electric power, and refrigeration may be reduced. Meanwhile, rapid deployment and re-deployment of resources may be implemented to meet service demands.

Thus, it can be seen that virtualization technologies are a focus in the development of the DC. For a basic network, virtualization technologies may be divided into two categories. In a first category, multiple physical devices are integrated into a logical device to simply network structure, which may be referred to as N:1 virtualization, such as stacking technologies. In a second category, a set of physical network is divided into multiple logical networks isolated from each other, or one physical device is divided into multiple virtual devices, which may be referred to as 1:N virtualization.

BRIEF DESCRIPTIONS OF THE DRAWINGS

DETAILED DESCRIPTION

Figure 1:
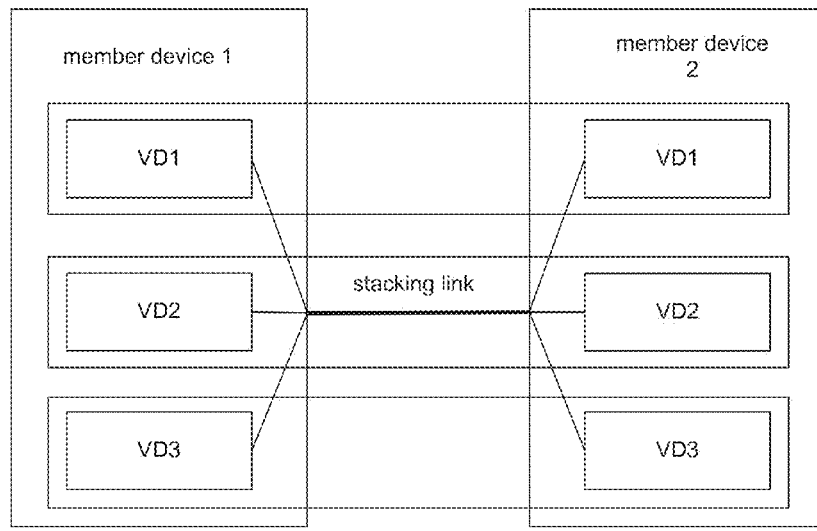
FIG. 1 is a schematic diagram illustrating virtualization of a Virtual Device (VD) in a stacking system in accordance with an example of the present disclosure.

For simplicity and illustrative purposes, the present disclosure is described by referring to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term includes" means includes but not limited to, the term including" means including but not limited to. The term based on" means based at least in part on. In addition, the terms a" and an" are intended to denote at least one of a particular element.

In DC networking, virtualization is used to integrate discrete networks into a common infrastructure. Subsequently, the operating cost advantages of a single infrastructure are provided while retaining management demarcation and fault isolation characteristics of physically independent networks.

By employing cross-device multilink bundling technologies, a single device may utilize an aggregate link to connect to two upstream devices bundled with a Virtual Port Channel (vPC). Thus, bandwidth of all of the uplinks may be fully utilized, link backup may be implemented, and rapid fault convergence may be provided when individual links fail. However, a single vPC domain uses links of 20 Gbps (Gigabit per second) to maintain devices bundled with VPC. When there are multiple Virtual Devices (VDs), the multiple VDs are bundled with multiple VPCs. Subsequently, bandwidth overheads of a system may be larger, deployment may be complicated and maintenance costs may be increased.

In the following examples of the present disclosure, a method for forwarding a packet in a stacking system is provided. When implementing link backup of a VD with stacking, each VD may use a shared stacking link to save bandwidth resources. A stacking port refers to a port used for device cascading. In the following examples of the present disclosure, a service port may be configured as a stacking port, which is dedicated for cascading a stacking device. The stacking system may include at least two member devices. Each member device may be divided into at least two VDs. A VD in the stacking system may be formed by VDs with the same VD number in each stacking member device. A first VD of a first member device may connect to a first VD of a second member device via a stacking link, which is established between the first member device and the second member device. The VD number of the first VD in the first member device is the same as that of the first VD in the second member device. The method may include the following. When a unicast packet is received via a service port, a VD of a member device may search in a forwarding table of the VD. When it is determined to forward the unicast packet to another member device based on the search result, the VD may forward the unicast packet via the stacking link.

That is to say, after a stacking is established among member devices, two VDs with the same number may be connected to each other via a stacking link. The two VDs are respectively located in two member devices connected with each other via the stacking link. FIG. 1 is a schematic diagram illustrating virtualization of VDs in a stacking system in accordance with an example of the present disclosure. In FIG. 1, a stacking link is established between member device 1 and member device 2. VD1 of member device 1 and VD1 of member device 2, VD2 of member device 1 and VD2 of member device 2, as well as VD3 of member device 1 and VD3 of member device 2 may be connected via the stacking link established between member device 1 and member device 2. In other words, the same stacking link may be shared.

Before describing packet forwarding in examples of the present disclosure, processes for establishing a stacking system, combining VDs, and configuring the sharing of a stacking link are briefly described.

A complete stacking system may be formed by executing the following four stages: topology collection, role election, member management and member maintenance. A physical connection is to be firstly established among member devices. The topology collection and role election may then be automatically executed to complete the establishment of the stack. Subsequently, the management and the maintenance of member devices may be started to maintain a stable relationship of member devices in the stacking system. In a stacking system supporting VDs, a management VD may be in charge of executing functions of foregoing 4 stages. A non-management VD may exist on the foregoing basis. When the stacking system powers on and starts, the management VD may firstly start and complete the establishment of the stacking system. Subsequently, the non-management VD may start. The management VD may also maintain changes in the stacking link information, such as configuration change about a stacking port, change about link state of a stacking port, and so on. When learning these changes, the management VD may inform other non-management VDs in realtime. In addition, the management VD may also complete the following operations, which do not involve non-management VDs, such as physical layer configuration of a stacking port.

The management VD may transmit a Hello packet with information about the formation of the stack. The Hello packet may carry a specified VD number and a special type identifier of the Hello packet. The Hello packet may be transmitted via a stacking port, which is specified by a Central Processing Unit (CPU). After a packet arrives at a stacking port of a destination member device, when the packet is determined as a Hello packet, the packet may be submitted to the CPU at the destination member device to be processed. Subsequently, CPU software may enter the stacking establishing state machine of the VD based on the VD number carried in the packet and update the stacking establishing state machine based on the packet. When there is no VD with a corresponding number in the member device, the CPU will not execute subsequent processes.

When a stacking is established among VDs with the same number in different member devices, the stage of management and maintenance of stacking state may be started, which may be performed by the management VD. The foregoing stage of management and maintenance of stacking state may include maintenance and detection of states of stacking link and member devices. When detecting that the stacking link disconnects or a member device exits, the management VD may inform each VD to split the stacking.

Except for the stacking protocol, other protocols may be in the charge of each VD independently. A control packet transmitted by each VD may be sent to a destination member device via a shared stacking port, which is specified by the CPU. The control packet may be identified by a special field identifier to be differentiated from a data packet. After receiving the control packet, the destination member device may transmit the control packet to the CPU to be processed. Subsequently, the CPU may inform a specified VD for subsequent processes based on the VD number carried in the packet.

When the stacking system starts, a management VD (default VD1) is firstly created. The management VD may be in charge of creating a non-management VD, that is, a user VD. The management VD is responsible for configuring each created user VD. Specifically speaking, for a distributed device, the following blocks may be included. A control board is divided according to the number of VDs. Service ports of an interface board is divided for each VD to divide the interface board for each VD. Thus, one interface board may be divided for one VD, or may be divided for multiple VDs. One VD may be allocated for one interface board, or for multiple interface boards. In the stacking system, the configurations of a member device and a stacking link of the member device are stored within the management VD. The non-management VD may automatically inherit these configurations, and may not modify the configurations independently. For a centralized device, each control board may be integrated into the interface board. When dividing the interface board for each VD, the division of the control board may be involved. When the whole interface board is divided for one VD, the control boards integrated into the interface board may be automatically divided for the VD. When one interface board is divided for multiple VDs, the control boards integrated into the interface board are also divided for each VD for which the interface board is divided.

When the stacking system starts, the management VD may issue to each user VD (1) a stacking port number of a stacking link established at the member device where the management VD is located, (2) a VD number allocated for each user VD, and (3) allocated service port numbers.

Each user VD may receive the information issued by the management VD to form an ingress port attribute table, which may include the VD number, the service port numbers and the stacking port number.

Descriptions about how to forward a packet in a stacking system will be provided in the following in detail accompanied with attached figures.

In view of above, examples of the present disclosure provide a method and a device for forwarding a packet in a stacking system. When implementing the link backup of a VD with stacking, each VD may use the shared stacking link. Subsequently, bandwidth resources may be saved.

In summary, in the examples of the present disclosure, a VD may be implemented in a stacking system. VDs with the same VD number in each member device may be combined to form and be managed as one VD. VDs with the same VD number in each member device may share the same stacking link. After receiving a unicast packet to be forwarded to another member device, the received unicast packet may be forwarded via the shared stacking link. When implementing the link backup of a VD with stacking, each VD may use the shared stacking link. Subsequently, bandwidth resources may be saved.

Figure 2:
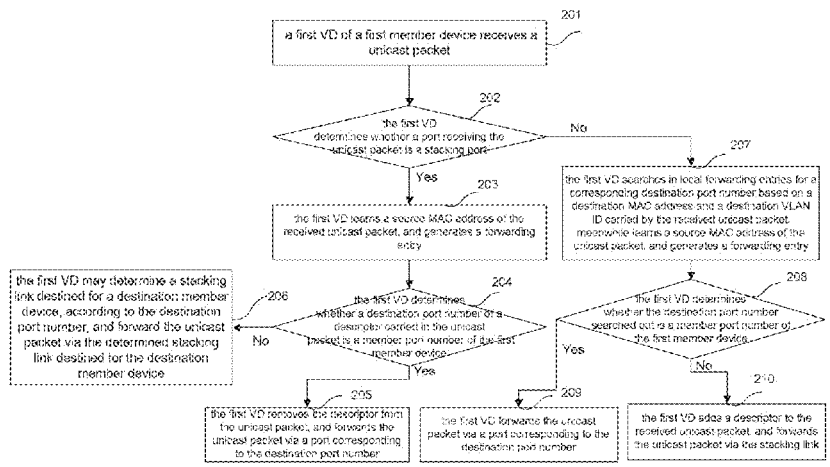
FIG. 2 is a flowchart illustrating a method for forwarding a unicast packet in a stacking system in accordance with an example of the present disclosure.

FIG. 2 is a flowchart illustrating a method for forwarding a unicast packet by a VD in a stacking system in accordance with an example of the present disclosure.

In block 201, a VD in a device member (e.g., a first VD of a first member device) receives a unicast packet.

In block 202, the first VD of the first member device determines whether a port that received the unicast packet is a stacking port. If yes, the method proceeds with block 203. Otherwise the method proceeds with block 207.

Each port may belong to one VD. Each VD may have an ingress port attribute table. Based on the port number of the port that received the unicast packet, the first VD of the first member device may search in an ingress port attribute table. Based on the search, the first VD of the first member device may learn whether the port that received the unicast packet is a stacking port or a service port.

In block 203, the first VD of the first member device may learn a source Media Access Control (MAC) address of the received unicast packet to generate a forwarding entry.

When a unicast packet is received by a stacking port, the unicast packet may include a descriptor. A VD on another member device and having the same VD number as the first VD of the first member device (e.g., a first VD of a second member device) may have added the descriptor when forwarding the unicast packet. The descriptor may include a VD number, a destination port number and a source port number. The source port number is the port number of a port from which the unicast packet entered the stacking system.

Subsequently, the first member device may receive the packet via the stacking port. Since the stacking port of each VD is the same, when the stacking port receives the unicast packet transmitted via the stacking link, the stacking port may deliver the unicast packet to a corresponding VD to be processed based on the VD number of the descriptor carried in the unicast packet.

The processes of learning the source MAC address and generating the forwarding entry include learning the source MAC address of the unicast packet and generating the forwarding entry which includes the source MAC address, a source Virtual Local Area Network (VLAN) ID and the source port number. The foregoing source port number is the source port number of the descriptor carried in the unicast packet.

In block 204, the first VD of the first member device determines whether the destination port number of the descriptor carried in the unicast packet is a member port number of the first member device. The member port number refers to a service port number of a particular VD on a member device. If yes, the method proceeds with block 205. Otherwise the method proceeds with block 206.

In block 205, the first VD of the first member device deletes the descriptor carried in the unicast packet, and forwards the unicast packet via a port corresponding to the destination port number. Subsequently, the flow may be terminated.

When it is determined that the destination port number of the descriptor carried in the unicast packet is a member port number of the first member device, the first VD of the first member device may determine that the unicast packet is to be forwarded to leave the stacking system. Subsequently, the descriptor may be removed from the unicast packet, and the unicast packet may be forwarded via the corresponding port.

In block 206, the first VD of the first member device may determine a stacking link via which the destination member device may be reached based on the destination port number, and forward the unicast packet via the determined stacking link to reach the destination member device.

When the destination port number carried by the unicast packet is determined not to be a member port number of the first member device, the first VD of the first member device may determine that the unicast packet is to be forwarded to another member device. At this time, the unicast packet still is to carry the descriptor. Meanwhile, the VD to process the unicast packet and the port number of the port from which the unicast packet entered the stacking system are unchanged. Thus, the unicast packet may be forwarded via the shared stacking link. When forwarding the unicast packet, the stacking link to forward the unicast packet may be determined based on the destination member device. That is, the unicast packet may not be forwarded back to the stacking link from which the unicast packet is received. Instead, the unicast packet may be forwarded via another stacking link. When the first VD of the first member device is connected to one stacking link, the foregoing forwarding scene may not occur.

In block 207, the first VD of the first member device may search in forwarding entries for a corresponding destination port number based on a destination MAC address and a destination VLAN ID carried in the unicast packet. Meanwhile, the first VD of the first member device may learn the source MAC address of the received unicast packet, and generate a forwarding entry.

The first VD of the first member device may learn the source MAC address of the unicast packet, and generate a forwarding entry, which includes the source MAC address, the source VLAN ID and the source port number. The foregoing source port number is the port number of the port which received the unicast packet.

In block 208, the first VD of the first member device determines whether the destination port number found in the search of the forwarding entries is a member port number of the first member device. If yes, the method proceeds with block 209. Otherwise the method proceeds with block 210.

In block 209, the first VD of the first member device forwards the unicast packet via the port corresponding to the destination port number, and terminates the procedure.

When the destination port number found in the search is determined to be a member port number of the first member device, the first VD of the first member device may further determine that the unicast packet is not to be forwarded to another member device. The first VD of the first member device may directly forward the unicast packet.

In block 210, the first VD of the first member device may add the descriptor to the received unicast packet, and forward the unicast packet via the stacking link.

When the destination port number found in the search is determined not to be a member port number of the first member device, the first VD of the first member device may further determine that the unicast packet is to be forwarded to another member device. When forwarding the unicast packet, the descriptor may be carried by the unicast packet. The descriptor may include a VD number, a destination port number and a source port number. In the example of the present disclosure, when a packet is forwarded to another member device via a shared stacking link, the packet may carry a VD number. Subsequently, when receiving the unicast packet, the other member device may learn the VD number and deliver the received unicast packet to a corresponding VD. As the unicast packet carries a source port number, the VD that receives the unicast packet via the shared stacking link may learn the real source port number when the VD learns the source MAC address of the received unicast packet. As the unicast packet carries a destination port number, time consumed when searching in a forwarding table for the destination port number may be saved because the destination port number may be directly obtained from the descriptor.

Thus, it can be seen that the descriptor may not include a destination port number in the example of the present disclosure. When receiving a unicast packet carrying a descriptor, a VD may search in a forwarding table for a destination port number based on the destination MAC address and destination VLAN ID carried in the unicast packet. After finding the destination port number, the specific implementation mode is similar to the foregoing method, which is not repeated here.

Descriptions about how to forward a multicast packet in a stacking system will be provided in the following accompanied with an example of the present disclosure.

Figure 3:
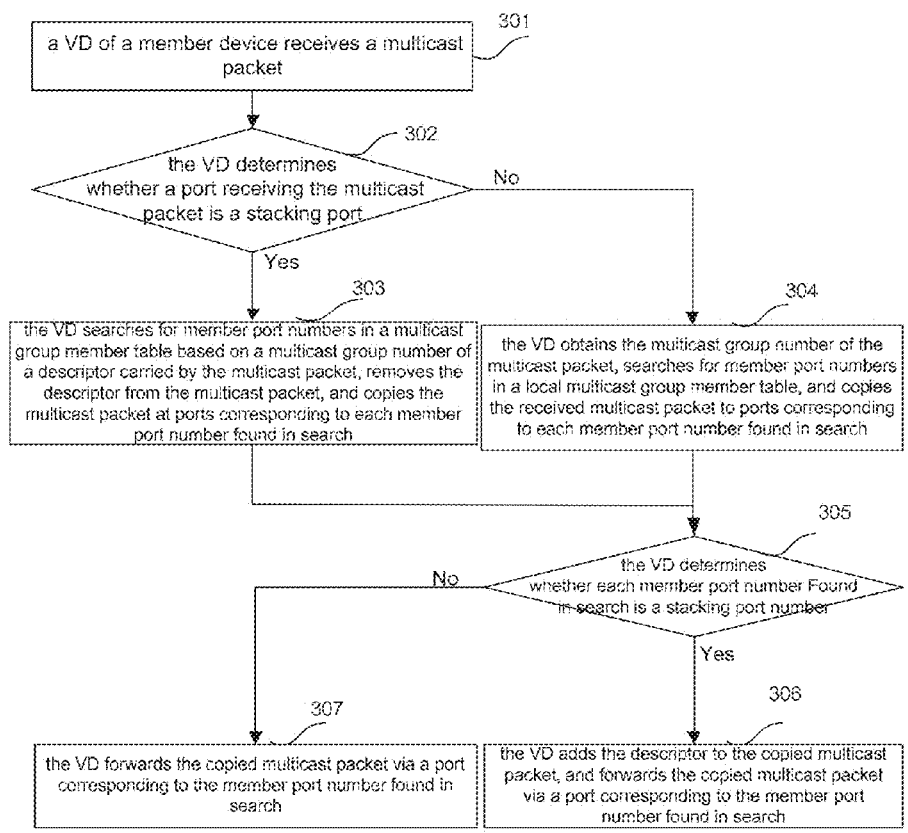
FIG. 3 is a flowchart illustrating a method for forwarding a multicast packet in a stacking system in accordance with an example of the present disclosure.

FIG. 3 is a flowchart illustrating a method for forwarding a multicast packet in a stacking system in accordance with an example of the present disclosure.

In block 301, a VD of a member device receives a multicast packet.

In block 302, the VD determines whether the port that received the multicast packet is a stacking port. If yes, the method proceeds with block 303. Otherwise the method proceeds with block 304.

In block 303, the VD searches for member port numbers in a multicast group member table based on a multicast group number of a descriptor carried in the multicast packet, removes the descriptor from the multicast packet, and copies the multicast packet to member ports corresponding to each member port number found in the search of the multicast group member table, and then proceeds with block 305.

In the block, when multiple interface boards are allocated for the VD, searching the multicast group member table includes searching in each interface board belonging to the VD. The copied multicast packets are original multicasts packet that do not carry the descriptor.

In block 304, the VD obtains the multicast group number of the multicast packet, searches in the multicast group member table for member port numbers based on the multicast group number, copies the received multicast packet to member ports corresponding to each member port number found in the search of the multicast group member table, and proceeds with block 305.

The multicast group number of the multicast packet may be learned based on the port that received the multicast packet.

In block 305, for each member port number found in the search, the VD determines if the member port number is a stacking port number. If yes, the method proceeds with block 306. Otherwise the method proceeds with block 307.

In block 306, the VD may add the descriptor to the copied multicast packet, and forward the copied multicast packet via a port corresponding to the member port number found in the search.

In the block, the carried descriptor may include the VD number of the VD, and the multicast group number of the multicast packet.

In block 307, the VD may forward the copied multicast packet via a port corresponding to the member port number found in the search.

Before forwarding the copied multicast packet, source port filtering may be performed so the multicast packet is not forwarded via the port that received the multicast packet.

A descriptor carried in the multicast packet, which is forwarded via the shared stacking link in block 306, may further include the source port number. Subsequently, when the multicast packet is received, a source MAC address of the multicast packet may be learned to generate a forwarding table. The forwarding table may be generated to guide the forwarding of unicast packets.

When the multicast packet is received via a service port, a VD may learn the source MAC address of the multicast packet to generate a forwarding entry, which includes the source MAC address, a source VLAN ID and a source port number. The source port number is the port number of the service port which received the multicast packet. When the multicast packet is received via a stacking port of a stacking link and the multicast packet is delivered to the VD to be processed based on the VD number carried in the descriptor, the VD may learn the source MAC address of the multicast packet, and generate a forwarding entry including the source MAC address, the source VLAN ID and the source port number. The foregoing source port number is the source port number of the descriptor carried in the multicast packet.

For example, as shown in FIG. 1, after VD1 of member device 1 transmits a unicast packet or a multicast packet to member device 2 via a stacking port of a stacking link, since the VD number carried in the descriptor of the unicast packet or the multicast packet is 1, the unicast or multicast packet may be delivered to VD1 of member device 2 to be processed. When VD1 of member device 2 learns that the destination port is a port of VD2 of member device 2, VD1 of member device 2 may forward the received unicast packet or multicast packet to VD2 of member device 2 via a service port.

When member device 2 connects with a member device 3 (not shown) via another stacking link (not shown), VD1 of member device 3 and VD1 of member device 2, VD2 of member device 3 and VD2 of member device 2, VD3 of member device 3 and VD3 of member device 2 may be connected via the stacking link, which is established between member device 2 and member device 3. That is, the same stacking link may be shared. After receiving a unicast packet or a multicast packet transmitted by VD1 of member device 1 via the stacking link between member device 1 and member device 2, and learning that the destination port of the received unicast or multicast packet is a port of member device 3, VD1 of member device 2 may transmit the unicast or multicast packet to member device 3 by using the stacking link between member device 2 and member device 3. Since the VD number carried in the descriptor of the received unicast or multicast packet is 1, the received unicast or multicast packet may be delivered to VD1 of member device 3 to be processed. When learning that the destination port is a port of VD3 of member device 3, VD1 of member device 3 may forward the received unicast or multicast packet to VD3 of member device 3 via a service port. When learning that the destination port is a port of a member device 4 (not shown), processing procedure is similar to that when VD1 of member device 2 transmits the unicast or multicast packet to VD1 of member device 3 via the stacking link, which is not repeated here.

Figure 4:
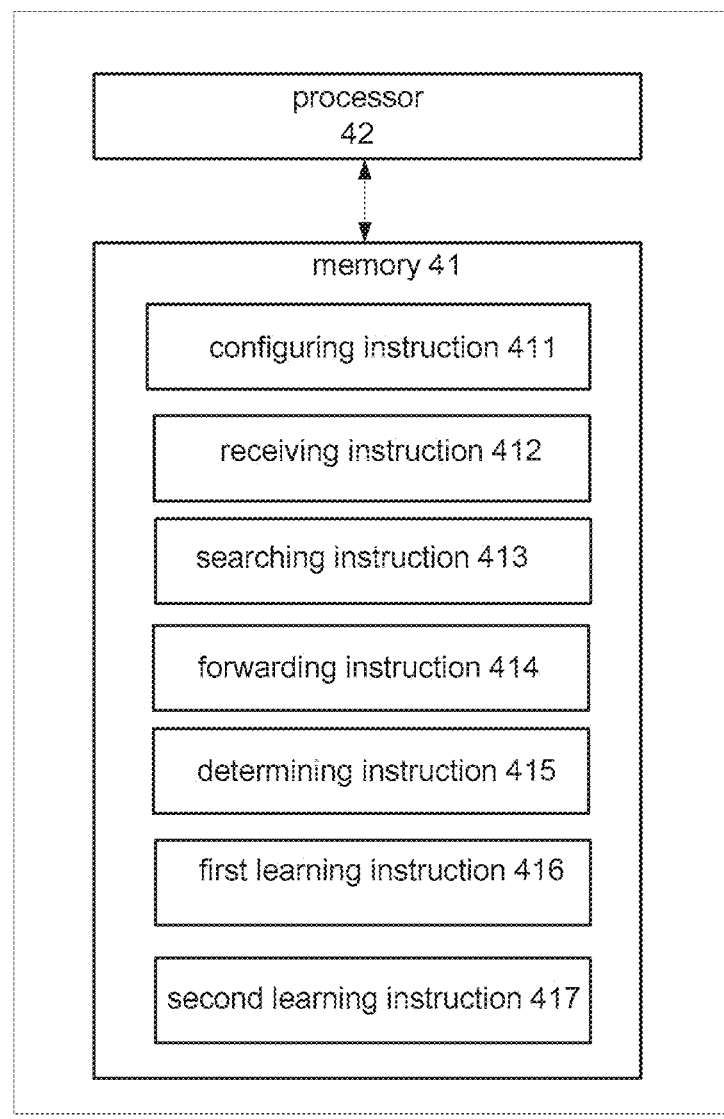
FIG. 4 is a schematic diagram illustrating structure of a device for forwarding a packet in a stacking system in accordance with an example of the present disclosure.

Based on the same concept, an example of the present disclosure also provides a device, which may be applied to a VD of a member device in a stacking system, which includes at least two member devices. Each member device is divided into at least two VDs. One VD in the stacking system may be formed by VDs, which are respectively located in each stacking member device and have the same VD number. FIG. 4 is a schematic diagram illustrating structure of a device for forwarding a packet in a stacking system in accordance with an example of the present disclosure. The device at least includes a memory 41, and a processor 42 in communication with memory 41. The memory 41 may store a configuring instruction 411, a receiving instruction 412, a searching instruction 413 and a forwarding instruction 414, which are executable by processor 42.

The configuring instruction 411 indicates a VD of a member device (e.g., a first VD of a first member device) to connect to A VD on another member device and having the same VD number as the first VD of the first member device (e.g., a first VD of a second member device) via a stacking link, which is established between the first member device and the second member device.

The receiving instruction 412 indicates to receive a unicast packet via a service port.

When a unicast packet is received based on the receiving instruction 412, the searching instruction 413 indicates to search in a forwarding table.

When a unicast packet is determined to be forwarded to another member device based on a search result of the searching instruction 413, the forwarding instruction 414 indicates to forward the unicast packet via a stacking link, which is configured based on the configuring instruction 411.

The searching instruction 413 indicates to search in a forwarding table for a corresponding destination port number based on a destination MAC address and a destination VLAN ID carried by a unicast packet. When the destination port number found in the search of the forwarding table is determined not to be a member port number of the member device, the unicast packet is determined to be forwarded to another member device.

The memory 41 further stores a determining instruction 415.

When a unicast packet is forwarded via a stacking link, the forwarding instruction 414 further indicates to add a descriptor to the unicast packet. The descriptor may include a destination port number found in a search and the VD number of the VD. When the destination port number of the descriptor carried in the unicast packet is determined to be a member port number of the member device based on the determining instruction 415, the forwarding instruction 414 may indicate to remove the descriptor from the unicast packet, and forward the unicast packet via a port corresponding to the destination port number. Otherwise, the forwarding instruction 414 may indicate to determine a stacking link destined for the destination member device based on the destination port number, and forward the unicast packet via the stacking link destined for the destination member device.

The receiving instruction 412 further indicates to receive a unicast packet via a stacking port of a stacking link, in which the unicast packet is delivered to a VD to be processed based on the VD number carried in a descriptor.

When a VD has received a unicast packet via a stacking port of the stacking link, in which the unicast packet is delivered to the VD to be processed based on the VD number carried in a descriptor, the determining instruction 415 indicates to determine whether the destination port number of the descriptor carried in the unicast packet is a member port number of the member device.

In another example, when a unicast packet is forwarded via a stacking link, the forwarding instruction 414 further indicates the unicast packet to carry a descriptor, which includes the VD number of the VD. When a destination port number found based on the determining instruction 415 is determined to be a member port number of the member device, the forwarding instruction 414 may indicate to remove the descriptor from the unicast packet, and forward the unicast packet via a port corresponding to the destination port number. Otherwise, the forwarding instruction 414 may indicate to determine another stacking link destined for the destination member device based on the destination port number, and forward the unicast packet via the other stacking link destined for the destination member device.

The receiving instruction 412 further indicates to receive a unicast packet via a stacking port of a stacking link, in which the unicast packet is delivered to a VD to be processed based on the VD number carried in a descriptor.

When a VD has received a unicast packet via a stacking port of a stacking link based on the receiving instruction 412, in which the unicast packet is delivered to the VD to be processed based on the VD number carried in a descriptor, the determining instruction 415 indicates to search in a forwarding table for a corresponding destination port number based on a destination MAC address and a destination VLAN ID carried in the unicast packet, and determine whether the destination port number found in the search is a member port number of the member device.

The memory 41 may further store a first learning instruction 416.

The forwarding instruction 414 may indicate to carry a descriptor by a unicast packet when forwarding the unicast packet via a stacking link. The descriptor may include a source port number, which is the port number of a service port from which the unicast packet entered the stacking system.

When receiving a unicast packet via a service port based on the receiving instruction 412, the first learning instruction 416 indicates to learn a source MAC address of the unicast packet to generate a forwarding entry including the source MAC address, a source VLAN ID and a source port number. The source port number is the port number of the service port that received the unicast packet. When the VD receives the unicast packet via a stacking port of a stacking link based on the receiving instruction 412, in which the unicast packet is delivered to the VD to be processed based on the VD number carried in a descriptor, the first learning instruction 416 may indicate to learn the source MAC address of the unicast packet, and generate a forwarding entry including the source MAC address, the source VLAN ID and the source port number. The foregoing source port number is the source port number of the descriptor carried in the unicast packet.

The receiving instruction 412 indicates to receive a multicast packet via a service port, and to receive a multicast packet delivered to a VD to be processed via a stacking port of a stacking link based on the VD number carried in a descriptor.

When a multicast packet is received via a service port based on the receiving instruction 412, the searching instruction 413 may indicate to obtain a multicast group number, and search in a multicast group member table of the VD based on the obtained multicast group number. When a VD receives the multicast packet via a stacking port of a stacking link based on the receiving instruction 412, in which the multicast packet is delivered to the VD to be processed according to the VD number carried in a descriptor, the searching instruction 413 may indicate to search in the multicast group member table based on the multicast group number of the descriptor carried in the multicast packet.

The forwarding instruction 414 indicates to copy a received multicast packet to each member port found in a search of the multicast group member table of a VD based on the searching instruction 413 and the obtained multicast group number. When a member port found in the search is a stacking port, the forwarding instruction 414 may indicate the multicast packet to carry a descriptor including the VD number and the multicast group number, and forward the multicast packet via a stacking link. When a member port found in the search is a service port, the forwarding instruction 414 may indicate to forward the copied multicast packet via the member port found in the search. When the multicast packet is received via the stacking port of the stacking link based on the receiving instruction 412, in which the multicast packet is delivered to the VD to be processed based on the VD number carried in the descriptor, the forwarding instruction 414 may indicate to remove the descriptor from the multicast packet received based on the receiving instruction 412, and copy the received multicast packet to each member port found in the search of the multicast group member table based on the multicast group number carried in the multicast packet and the searching instruction 413. When a member port found in the search is another stacking port, the forwarding instruction 414 indicates the copied multicast packet to carry another descriptor including the VD number of the VD and the multicast group number, and forward the copied multicast packet via the member port found in the search. When a member port found in the search is a service port, the forwarding instruction 414 may indicate to forward the copied multicast packet via the member port found in the search.

The memory 41 further stores a second learning instruction 417.

The forwarding instruction 414 indicates a multicast packet forwarded via a stacking link to carry a descriptor, which includes a source port number. The source port number is the port number of a service port from which the multicast packet entered the stacking system.

When a multicast packet is received via a service port based on the receiving instruction 412, the second learning instruction 417 indicates to learn a source MAC address of the multicast packet, and to generate a forwarding entry, which includes the source MAC address, a source VLAN ID and a source port number. The source port number is the port number of a port that received the multicast packet. When receiving the multicast packet is received via a stacking port of a stacking link based on the receiving instruction 412, in which the multicast packet is delivered to a VD to be processed based on the VD number carried in a descriptor, the second learning instruction 417 indicates to learn the source MAC address of the multicast packet, and to generate a forwarding entry including the source MAC address, the source VLAN ID and the source port number. The source port number is the source port number of the descriptor carried in the multicast packet.

Figure 5:
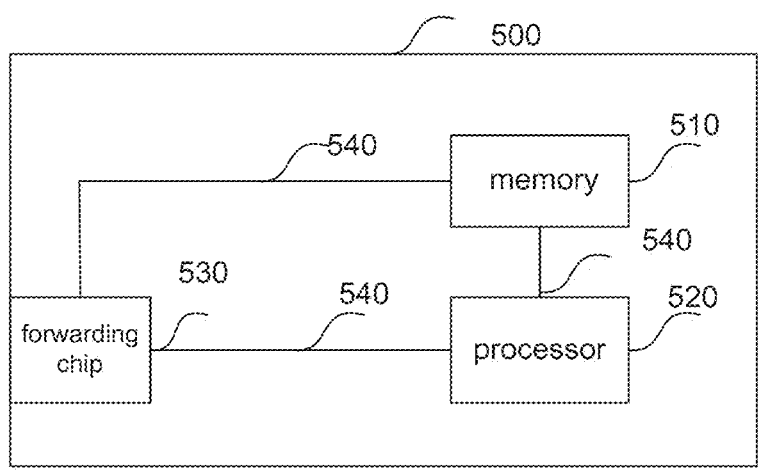
FIG. 5 is a schematic diagram illustrating hardware architecture of a device 500 for forwarding a packet in a stacking system in accordance with an example of the present disclosure.

Descriptions about a device for forwarding a packet in a stacking system are provided above in accordance with an example of the present disclosure. In the following, descriptions about hardware structure of another device for forwarding a packet in a stacking system are provided in accordance with another example of the present disclosure. The device is a programmable device combining hardware with software. FIG. 5 is a schematic diagram illustrating hardware structure of a device 500 for forwarding a packet in a stacking system in accordance with an example of the present disclosure. The device 500 may include a memory 510, a processor 520, a packet processing chip 530 and an interconnection part coupling the memory 510, the processor 520 and the packet processing chip 530 with each other.

The memory 510 is configured to store instruction codes. When the instruction codes are executed, completed operations are similar to that indicated by the determining instruction 415, the searching instruction 413, the first learning instruction 416, the second learning instruction 417 and the forwarding instruction 414 stored in memory 41 of the device shown in FIG. 4, which are not repeated here.

The processor 520 is configured to communicate with the packet processing chip 530 to receive and transmit a unicast packet or a multicast packet. The processor 520 is further configured to communicate with the memory 510 to read and execute the instruction codes stored in the memory 510 such that the operations indicated to be completed by the determining instruction 415, the searching instruction 413, the first learning instruction 416, the second learning instruction 417 and the forwarding instruction 414 may be performed. The processor 520 is further configured to process the packet received by the packet processing chip 530.

The packet processing chip 530 is configured to connect with another member device in the stacking system and a device exterior of the stacking system via a port of the chip. The packet processing chip 530 is in charge of receiving and transmitting a data packet, receiving and transmitting a unicast packet or a multicast packet via a stacking port, as well as receiving and transmitting a multicast packet or a unicast packet via a service port.

It should be noted that, the devices for forwarding a packet in a stacking system shown in FIG. 4 or FIG. 5 are examples, which may be implemented with a structure different from that described with FIG. 4 or FIG. 5. For example, the operations completed when executing foregoing instruction codes may also be implemented with an Application Specific Integrated Circuit (ASIC). Besides, there may be one or more processors 520. When there are multiple processors 520, the multiple processors 520 may be in charge of reading and executing the instruction codes. Thus, the specific structure of a device for forwarding a packet in a stacking system is not limited by the examples of the present disclosure.

In view of above, in an example of the present disclosure, a VD may be implemented in a stacking system. VDs with the same VD number in each member device may be combined to be managed as one VD. VDs with the same VD number in each member device may share the same stacking link. When receiving a unicast packet to be forwarded to another member device, the received unicast packet may be forwarded via the shared stacking link. When implementing the link backup of the VD with the stacking, each VD may use the shared stacking link to save bandwidth resources.

In practical applications, when a packet forwarded via the stacking link carries a descriptor, which includes a VD number and a source port number, when the packet is received via the shared stacking link, it may be learned which VD to deliver the packet by using the descriptor carried by the packet, and the source MAC address of the packet may be learned based on the source port number of the descriptor.

The invention claimed is:

1. A method for forwarding a packet in a stacking system comprising at least two member devices, wherein each member device comprises at least two Virtual Devices (VDs), a first VD of a first member device connects with a first VD of a second member device via a stacking link that is established between the first member device and the second member device, a VD number of the first VD in the first member device is the same as that of the first VD in the second member device, the method comprising:

when a unicast packet is received via a service port, searching, by the first VD of the first member device, in a forwarding table of the first VD of the first member device;

determining, by the first VD of the first member device, if the unicast packet is to be forwarded to another member device based on said searching;

when the unicast packet is to be forwarded to another member device, forwarding, by the first VD of the first member device, the unicast packet via the stacking link;

when the unicast packet is forwarded via the stacking link, adding, by the first VD of the first member device, a descriptor to the unicast packet, wherein the descriptor comprises the VD number of the first VD of the first member device;

when the unicast packet is received via a stacking port of the stacking link and the unicast packet is delivered to the first VD of the second member device based on the VD number carried in the descriptor, searching, by the first VD of the second member device, in a forwarding table of the first VD of the second device for a corresponding destination port number based on a destination MAC address and a destination VLAN ID carried in the unicast packet, and determining if the destination port number is one of member port numbers of the second member device; and when the destination port number is one of the member port numbers of the second member device, removing, by the first VD of the second member device, the descriptor from the unicast packet and forwarding the unicast packet via a port corresponding to the destination port number; when the destination port number is not one of the member port numbers of the second member device, determining, by the first VD of the second member device, a stacking link destined for a destination member device based on the destination port number and forwarding the unicast packet via the stacking link destined for the destination member device.

2. The method according to claim 1, wherein said searching and said determining comprise:

determining, by the first VD of the first member, if the destination port number is one of member port numbers of the first member device; and when the destination port number is not one of the member port numbers of the first member device, determining, by the first VD of the first member device, the unicast packet is to be forwarded to another member device.

3. The method according to claim 2, further comprising:

when the unicast packet is forwarded via the stacking link, adding, by the first VD of the first member device, the descriptor to the unicast packet, wherein the descriptor comprises the destination port number and the VD number of the first VD of the first member device;

when the unicast packet is received via a stacking port of the stacking link and the unicast packet is delivered to the first VD of the second member device based on the VD number carried in the descriptor, determining, by the first VD of the second member device, if the destination port number of the descriptor carried in the unicast packet is one of member port numbers of the second member device;

when the destination port number of the descriptor carried in the unicast packet is one of the member port numbers of the second member device, removing the descriptor from the unicast packet and forwarding the unicast packet via a port corresponding to the destination port number;

when the destination port number of the descriptor carried in the unicast packet is not one of the member port numbers of the second member device, determining a stacking link destined for a destination member device based on the destination port number and forwarding the unicast packet via the stacking link destined for the destination member device.

4. The method according to claim 3, wherein:

the descriptor further comprises a source port number, which is a port number of a service port from which the unicast packet entered the stacking system; and the method further comprises:

when the unicast packet is received via the service port, learning, by the first VD of the first member device, a source MAC address of the unicast packet and generating a forwarding entry which comprises the source MAC address, a source VLAN ID and the source port number, wherein the source port number is a port number of the service port which receives the unicast packet;

when the unicast packet is received via the stacking port of the stacking link, wherein the unicast packet is delivered to the first VD of the second member device based on the VD number carried in the descriptor, learning, by the first VD of the second member device, the source MAC address of the unicast packet, generating a forwarding entry which comprises the source MAC address, the source VLAN ID and the source port number, wherein the source port number is the source port number of the descriptor carried by the unicast packet.

5. The method according to claim 1, further comprising:

when a multicast packet is received via a service port of the second member device, obtaining, by the first VD of the second member device, a multicast group number, searching for member ports associated with the multicast group number in a multicast group member table of the first VD in the first member device based on the multicast group number, and copying the multicast packet to each of the associated member ports;

for each of the associated member ports that is a stacking port, adding, by the first VD of the second member device, a descriptor to the multicast packet, wherein the descriptor comprises the VD number of the first VD in the second member device and the multicast group number, and forwarding the multicast packet via the stacking link;

for each of the associated member ports that is a service port, forwarding, by the first VD of the second member device, the copied multicast packet via the associated member port;

when the multicast packet is received via a stacking port of the stacking link and the multicast packet is delivered to the first VD of the second member device based on the VD number carried by another descriptor, searching, by the first VD of the second member device, for the associated member ports in a multicast group member table of the first VD of the second member device based on the multicast group number in the other descriptor carried by the multicast packet, removing the other descriptor from the multicast packet, and copying the multicast 20 packet to each of the associated member ports;

for each of the associated member ports that is a stacking port, adding, by the first VD of the second member device, the descriptor to the copied multicast packet, wherein the descriptor comprises the VD number of the first VD in the second member device and the multicast group number, and forwarding the copied multicast packet via the associated member port;

for each of the associated member ports that is a service port, forwarding, by the first VD of the second member device, the copied multicast packet via the associated member port.

6. The method according to claim 5, wherein the descriptor carried in the multicast packet further comprises a source port number, which is a port number of a service port from which the multicast packet entered the stacking system; and the method further comprises:

when the multicast packet is received via the service port, learning, by the first VD of the second member device, a source MAC address of the multicast packet, generating a forwarding entry comprising the source MAC address, a source VLAN ID and the source port number, wherein the source port number is a port number of the service port that received the multicast packet;

when the multicast packet is received via the stacking port of the stacking link and the multicast packet is delivered to the first VD of the second member device based on the VD number carried by the descriptor, learning, by the first VD of the second member device, the source MAC address of the multicast packet, generating the forwarding entry comprising the source MAC address, the source VLAN ID and the source port number, wherein the source port number is the source port number of the other descriptor carried in the multicast packet.

7. A device to implement a Virtual Device (VD) of a member device in a stacking system, wherein the stacking system comprises at least two member devices, each member device comprises at least two VDs, the device comprises at least a non-transitory computer readable memory and a processor in communication with the memory, wherein the memory stores instructions that are executable by the processor comprising:

a configuring instruction to connect a first VD of a first member device to a first VD of a second member device via a stacking link that is established between the first member device and the second member device, a VD number of the first VD in the first member device being the same as that of the first VD in the second member device;

a receiving instruction to receive a unicast packet via a service port;

a searching instruction to search in a forwarding table for a corresponding destination port number based on a destination Media Access Control (MAC) address and a destination Virtual Local Area Network (VLAN) Identifier (ID) carried in the unicast packet when the unicast packet is received based on the receiving instruction, the searching instruction is to determine that the unicast packet is to be forwarded to another member device via the stacking link when the destination port number is not one of the member port numbers of the member device;

a determining instruction is to determine if the destination port number is one of member port numbers of a member device; and a forwarding instruction to forward the unicast packet via the stacking link configured based on the configuring instruction when the unicast packet is to be forwarded to another member device based on a search result of the searching instruction, the forwarding instruction further indicates to add a descriptor to the unicast packet, wherein the descriptor comprises the destination port number and a VD number of a VD forwarding the unicast packet when the unicast packet is to be forwarded to another member device via the stacking link.

8. The device according to claim 7, wherein:
the memory further stores a learning instruction;
the learning instruction is to learn a source MAC address of the unicast packet, and to generate a forwarding entry comprising the source MAC address, a source VLAN ID and a source port number, wherein the source port number is a port number of the service port that received the unicast packet.

9. The device according to claim 7, wherein:
the memory further stores a determining instruction;
the receiving instruction is to further receive another unicast packet via the stacking port of the stacking link, wherein the other unicast packet is delivered to a VD based on a VD number in a descriptor carried in the other unicast packet;
when the other unicast packet is received via the stacking port of the stacking link and the other unicast packet is delivered to the VD based on the VD number in the descriptor, the determining instruction is to determine whether a destination port number in the descriptor carried in the other unicast packet is one of member port numbers of a member device;
when the destination port number of the descriptor carried in the other unicast packet is one of the member port numbers of the member device, the forwarding instruction is to remove the descriptor from the other unicast packet, and forward the other unicast packet via a port corresponding to the destination port number;
when the destination port number of the descriptor carried in the other unicast packet is not one of the member port numbers of the member device, the forwarding instruction is to determine another stacking link destined for a destination member device based on the destination port number, and forward the other unicast packet via the stacking link destined for the destination member device.

10. The device according to claim 9, wherein:
the memory further stores a learning instruction;
the descriptor further comprises a source port number, which is a port number of a service port from which the unicast packet entered the stacking system;
when receiving the other unicast packet via the stacking port of the stacking link base on the receiving instruction and the unicast packet is delivered to the VD to be processed based on the VD number carried in the descriptor, the learning instruction is to learn a source MAC address of the unicast packet, to generate a forwarding entry comprising the source MAC address, a source VLAN ID and the source port number, wherein the source port number is the source port number of the descriptor carried in the unicast packet.

11. The device according to claim 7, wherein:
the receiving instruction is to receive a multicast packet via a service port or a stacking port of the stacking link;
when the multicast packet is received via the stacking port of the stacking link, the multicast packet carries a descriptor and the receiving instruction is to deliver the multicast packet to a VD to be processed based on a VD number carried in the descriptor;
when the multicast packet is received via the service port based on the receiving instruction, the searching instruction is to obtain a multicast group number, and search in a multicast group member table of the VD based on the multicast group number;
when the multicast packet is received via the stacking port of the stacking link based on to the receiving instruction:
the searching instruction is to search in the multicast group member table based on the multicast group number carried in the descriptor;
the forwarding instruction is to remove the descriptor from the multicast packet;
the forwarding instruction is to copy the multicast packet to each of member ports found in the multicast group member table of the VD based on the multicast group number;
for each member port that is another stacking port, the forwarding instruction is to add another descriptor to the multicast packet, and to forward the multicast packet via the other stacking link, wherein the other descriptor comprises the VD number and the multicast group number;
for each of member port that is a service port, the forwarding instruction is to forward the multicast packet via the member port.

12. The device according to claim 11, wherein:
the memory further stores a learning instruction;
the descriptor further comprises a source port number, which is a port number of a service port from which the multicast packet entered the stacking system;
when the multicast packet is received via the service port based on the receiving instruction, the learning instruction is to learn a source MAC address of the multicast packet, to generate the forwarding entry comprising the source MAC address, a source VLAN ID and the source port number, wherein the source port number is a port number of a port receiving the multicast packet;
when the multicast packet is received via the stacking port of the stacking link based on the receiving instruction and the multicast packet is delivered to the VD to be processed based on the VD number carried in the descriptor, the learning instruction is to learn the source MAC address of the multicast packet, and to generate the forwarding entry comprising the source MAC address, the source VLAN ID and the source port number, wherein the source port number is the source port number of the descriptor carried in the multicast packet.

13. A non-transitory machine readable storage medium comprising instructions executable by a physical processor to implement a Virtual Device (VD) of a member device in a stacking system, wherein the stacking system comprises at least two member devices, each member device comprises at least two VDs, the machine-readable storage medium comprising:
a configuring instruction to connect a first VD of a first member device to a first VD of a second member device via a stacking link that is established between the first member device and the second member device, a VD number of the first VD in the first member device being the same as that of the first VD in the second member device;
a receiving instruction to receive a unicast packet via a service port;
a searching instruction to search in a forwarding table for a corresponding destination port number based on a destination Media Access Control (MAC) address and a destination Virtual Local Area Network (VLAN) Identifier (ID) carried in the unicast packet when the unicast packet is received based on the receiving instruction, the searching instruction is to determine that the unicast packet is to be forwarded to another member device via the stacking link when the destination port number is not one of the member port numbers of the member device;
a determining instruction is to determine if the destination port number is one of member port numbers of a member device; and
a forwarding instruction to forward the unicast packet via the stacking link configured based on the configuring instruction when the unicast packet is to be forwarded to another member device based on a search result of the searching instruction, the forwarding instruction further indicates to add a descriptor to the unicast packet, wherein the descriptor comprises the destination port number and a VD number of a VD forwarding the unicast packet when the unicast packet is to be forwarded to another member device via the stacking link.

14. The non-transitory machine-readable storage medium of claim 13, further comprising:
a learning instruction to learn a source MAC address of the unicast packet, and to generate a forwarding entry comprising the source MAC address, a source VLAN ID and a source port number, wherein the source port number is a port number of the service port that received the unicast packet.

15. The non-transitory machine-readable storage medium of claim 13, further comprising:
a determining instruction;
wherein:
the receiving instruction is to further receive another unicast packet via the stacking port of the stacking link, wherein the other unicast packet is delivered to a VD based on a VD number in a descriptor carried in the other unicast packet;
when the other unicast packet is received via the stacking port of the stacking link and the other unicast packet is delivered to the VD based on the VD number in the descriptor, the determining instruction is to determine whether a destination port number in the descriptor carried in the other unicast packet is one of member port numbers of a member device;
when the destination port number of the descriptor carried in the other unicast packet is one of the member port numbers of the member device, the forwarding instruction is to remove the descriptor from the other unicast packet, and forward the other unicast packet via a port 5 corresponding to the destination port number;
when the destination port number of the descriptor carried in the other unicast packet is not one of the member port numbers of the member device, the forwarding instruction is to determine another stacking link destined for a destination member device based on the destination port number, and forward the other unicast packet via the stacking link destined for the destination member device.

16. The non-transitory machine-readable storage medium of claim 15, further comprising:
a learning instruction;
wherein:
the descriptor further comprises a source port number, which is a port number of a service port from which the unicast packet entered the stacking system;
when receiving the other unicast packet via the stacking port of the stacking link base on the receiving instruction and the unicast packet is delivered to the VD to be processed based on the VD number carried in the descriptor, the learning instruction is to learn a source MAC address of the unicast packet, to generate a forwarding entry comprising the source MAC address, a source VLAN ID and the source port number, wherein the source port number is the source port number of the descriptor carried in the unicast packet.

17. The non-transitory machine-readable storage medium of claim 13, wherein:
the receiving instruction is to receive a multicast packet via a service port or a stacking port of the stacking link;
when the multicast packet is received via the stacking port of the stacking link, the multicast packet carries a descriptor and the receiving instruction is to deliver the multicast packet to a VD to be processed based on a VD number carried in the descriptor;
when the multicast packet is received via the service port based on the receiving instruction, the searching instruction is to obtain a multicast group number, and search in a multicast group member table of the VD based on the multicast group number;

when the multicast packet is received via the stacking port of the stacking link based on to the receiving instruction:
the searching instruction is to search in the multicast group member table based on the multicast group number carried in the descriptor;
the forwarding instruction is to remove the descriptor from the multicast packet;
the forwarding instruction is to copy the multicast packet to each of member ports found in the multicast group member table of the VD based on the multicast group number;
for each member port that is another stacking port, the forwarding instruction is to add another descriptor to the multicast packet, and to forward the multicast packet via the other stacking link, wherein the other descriptor comprises the VD number and the multicast group number;
for each of member port that is a service port, the forwarding instruction is to forward the multicast packet via the member port.

18. The non-transitory machine-readable storage medium of claim 17, further comprising:
a learning instruction;
wherein:
the descriptor further comprises a source port number, which is a port number of a service port from which the multicast packet entered the stacking system;
when the multicast packet is received via the service port based on the receiving instruction, the learning instruction is to learn a source MAC address of the multicast packet, to generate the forwarding entry comprising the source MAC address, a source VLAN ID and the source port number, wherein the source port number is a port number of a port receiving the multicast packet;
when the multicast packet is received via the stacking port of the stacking link based on the receiving instruction and the multicast packet is delivered to the VD to be processed based on the VD number carried in the descriptor, the learning instruction is to learn the source MAC address of the multicast packet, and to generate the forwarding entry comprising the source MAC address, the source VLAN ID and the source port number, wherein the source port number is the source port number of the descriptor carried in the multicast packet.

* * * * *